(12) United States Patent
Murat

(10) Patent No.: US 9,827,834 B1
(45) Date of Patent: Nov. 28, 2017

(54) AUXILIARY SUN VISOR

(71) Applicant: Marie Rose Odette Murat, Patterson, NY (US)

(72) Inventor: Marie Rose Odette Murat, Patterson, NY (US)

( * ) Notice: Subject to any disclaimer, the term of this patent is extended or adjusted under 35 U.S.C. 154(b) by 0 days.

(21) Appl. No.: 15/530,241

(22) Filed: Dec. 16, 2016

(51) Int. Cl.
  *B60J 3/00* (2006.01)
  *B60J 3/02* (2006.01)

(52) U.S. Cl.
  CPC ............ *B60J 3/0278* (2013.01); *B60J 3/023* (2013.01); *B60J 3/026* (2013.01); *B60J 3/0226* (2013.01); *B60J 3/0239* (2013.01); B60Y 2304/03 (2013.01); B60Y 2410/122 (2013.01)

(58) Field of Classification Search
  CPC ...... B60J 3/0208; B60J 3/0278; B60J 3/0226; B60J 3/023; B60J 3/0239; B60J 3/026
  USPC ........................................................ 296/97.6
  See application file for complete search history.

(56) References Cited

U.S. PATENT DOCUMENTS

| | | | | |
|---|---|---|---|---|
| 4,053,180 A | * | 10/1977 | White | B60J 3/0208 296/97.6 |
| 4,762,359 A | * | 8/1988 | Boerema | B60J 3/0208 296/97.11 |
| 5,445,427 A | * | 8/1995 | Vandagriff | B60J 3/0208 296/97.11 |
| 9,493,055 B1 | * | 11/2016 | Murat | B60J 3/0208 |
| 2005/0230998 A1 | * | 10/2005 | Im | B60J 3/0208 296/97.6 |

* cited by examiner

*Primary Examiner* — Joseph D Pape

(57) ABSTRACT

An auxiliary sun visor that attaches to an existing vehicle sun visor assembly which allows the auxiliary visor to act as a front facing sun block while the standard vehicle visor can be swung ninety degrees to block sun coming in from the side window. A hook assembly on one side of the auxiliary visor snaps onto the existing hinge post of the standard vehicle visor. A crescent shaped member of the auxiliary sun visor is trapped inside the standard visor's receiver hook, behind the tubular shaped end portion of the standard visor. The auxiliary visor is adjustable lengthwise to accommodate different vehicle visor sizes. A spring steel member holds the sun blocking panel of the auxiliary visor in the upward, upward position when not in use.

5 Claims, 7 Drawing Sheets

AUXILIARY SUN VISOR

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of sun blocking devices for use in vehicles and more specifically to an auxiliary sun visor.

Fold down sun visors found in most vehicles are well known. They are used to block the sun when the sun is in a relatively low position in the sky. The visor can be rotated down to block sun coming head-on, and can be swung ninety degrees to block sun that may be entering the side window.

Various types of visor extenders have been designed and manufactured that can clip onto an existing visor to help extend the existing visor's sun blocking ability—either in the side to side direction or in the downward direction.

However, there is a deficiency in the prior technology in that a single visor cannot block sun from both the front and the side at the same time while being held in a secure manner. The petitioner's recently granted patent titled "Attachable Secondary Sun Visor", U.S. Pat. No. 9,493,055 B1, discloses one way to solve the above described problem. However the present invention is novel, less expensive to manufacture and still can be used on the driver's side visor or the passenger side visor.

BRIEF SUMMARY OF THE INVENTION

The primary object of the invention is to provide an auxiliary sun visor that allows a driver of a vehicle to block head on sun as well as sun that might shine through a side window during the course of driving.

Another object of the invention is to provide an auxiliary sun visor that can be easily adjusted lengthwise to attach to a variety of models of vehicles.

Another object of the invention is to provide an auxiliary sun visor that is thin enough to reside in the space between the upper surface of the standard vehicle visor and the ceiling of the vehicle.

A further object of the invention is to provide an auxiliary sun visor that can be attached and used either on the driver's side or the passenger side.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an auxiliary sun visor comprising: a hook assembly, a crescent shaped visor receiving member, an elongate tube, a sandwich of three panels, two said panels being exterior and one said panel being interior, a spring member, a tube retaining member, said hook assembly including a resilient U shaped member rotatably attached to a rigid metal rod member, said rigid rod member including a flattened portion, said spring member made of tempered steel and frictionally engaging said flat portion of said rod member, said spring member capable of rotatably engaging said rigid metal rod member, said exterior panels fixedly attached on three sides and open on one side, said interior panel slidably engaged within said exterior panels and capable of sliding out of said open side of said exterior panels to create additional sun blocking ability, said U shaped member capable of snapping onto the main hinge post of a standard vehicle visor assembly, said crescent shaped visor receiving member fixedly attached to one end of said elongate tube, said metal rod member of said hook assembly slidably engaged within said elongate tube, said sandwich of three panels capable of remaining in a horizontally disposed position when the flat portion of said rigid rod engages the flat portion of said spring member, said crescent shaped visor receiving member capable of nesting in the receiving space of a standard vehicle visor receiving member, and said crescent shaped visor receiving member being thin enough to fit between the tubular portion found at the distal end of a standard vehicle sun visor and the said receiving space of a standard vehicle visor receiving member.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
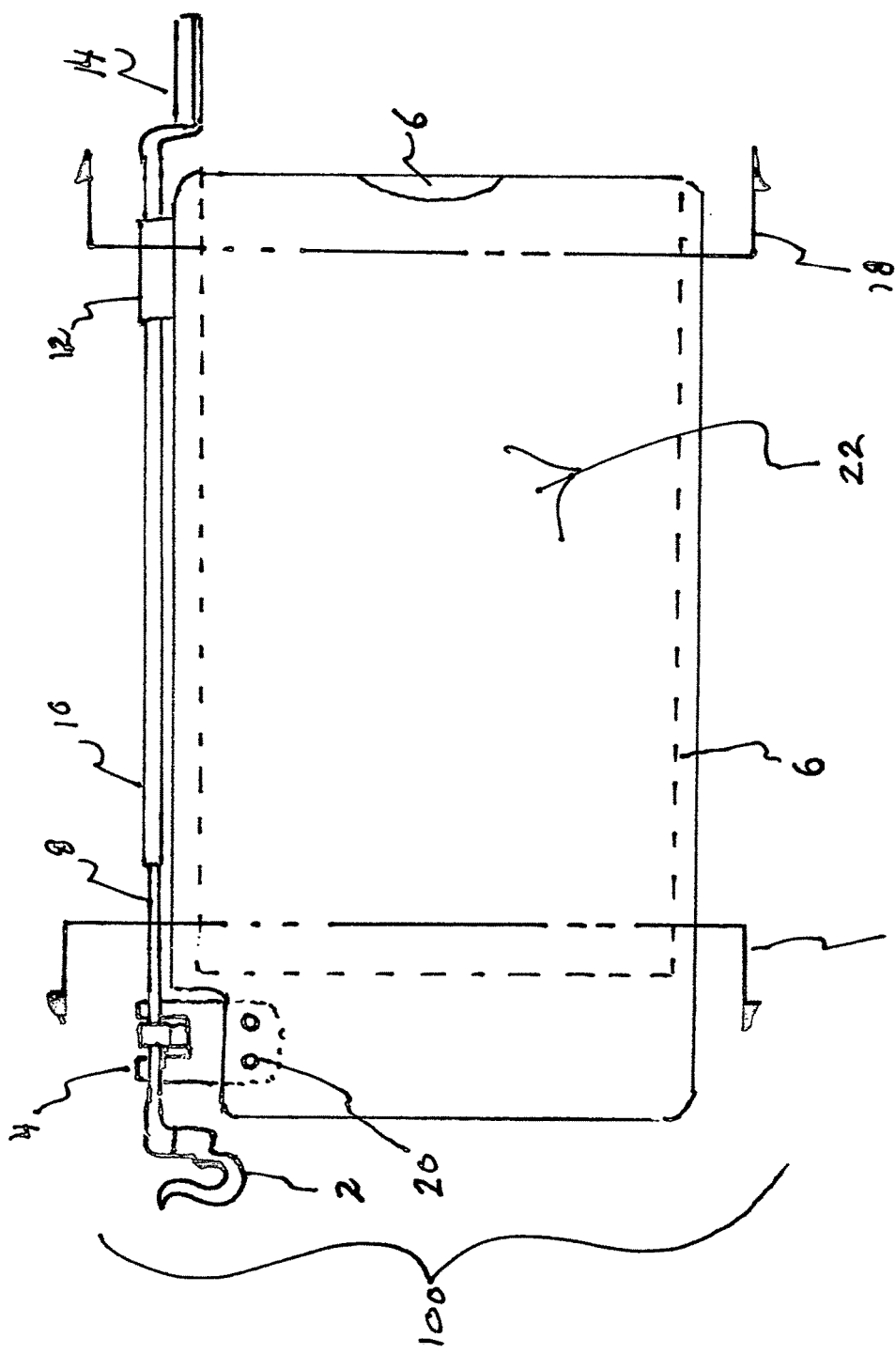
FIG. 1 is a front view of the invention.
Figure 2:
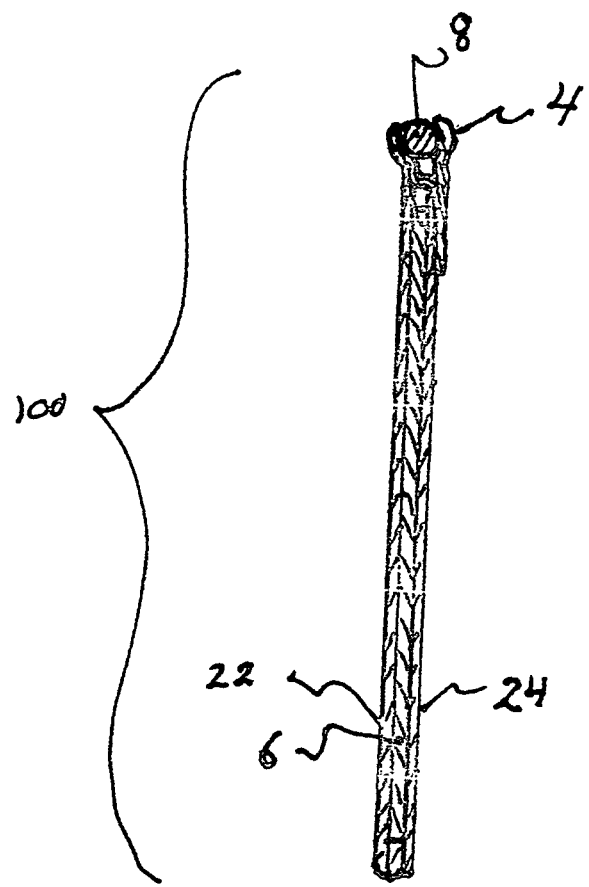
FIG. 2 is the side section view of the invention illustrating interconnection with the standard visor.
Figure 3:
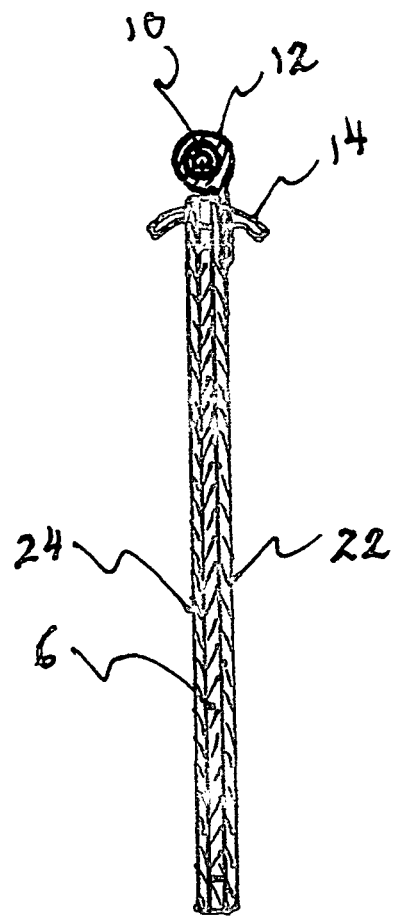
FIG. 3 is a second side section view of the invention illustrating the interconnection feature of the hook assembly.

Referring now to FIG. 1 we see a front plan view of the invention 100. An auxiliary sun visor first panel 22 is rotatably supported by elongate tube 10 and rod 8 assembly where the rod 8 portion terminates in a flexible U shaped hook member 2 and the tube assembly 10 terminates in a crescent shaped 14 member. The crescent shaped member 14 can nest within the standard visor receiving member 30 of a vehicle as shown in the perspective view in FIG. 4. A spring steel member 4 made of tempered steel, captures the rod 8 in a frictional fashion. A second panel 6, shown in dotted lines, is slidably retained within first panel 22 and third panel 24 as shown in FIGS. 2, 3, 5. Panels 22 and 24 are welded together on three sides of the perimeter. The fourth side is open to allow middle panel 6 to slide out when needed. Tubular portion 12 is fixedly attached to the upper right corner of first panel 22 and acts to support the panel 22 while also allowing elongate tube 10 to slide within the tubular portion 12.

FIG. 2 is a side section view as defined by section line 16 shown in FIG. 1. panels 22, 6 and 24 are sandwiched together as described above. A spring member 4 includes fingers that frictionally grasp rod 8 and allow the panel sandwich 22, 6, 24 to rotate about rod 8 and maintain its position wherever the user positions it.

FIG. 3 is another side section view as defined by section line 18 shown in FIG. 1. This view shows tube member 10 in concentric orientation with outer tube holder 12. Tube holder 12 is fixed to panel 22. The crescent shaped member 14 can be seen in its end view.

Figure 4:
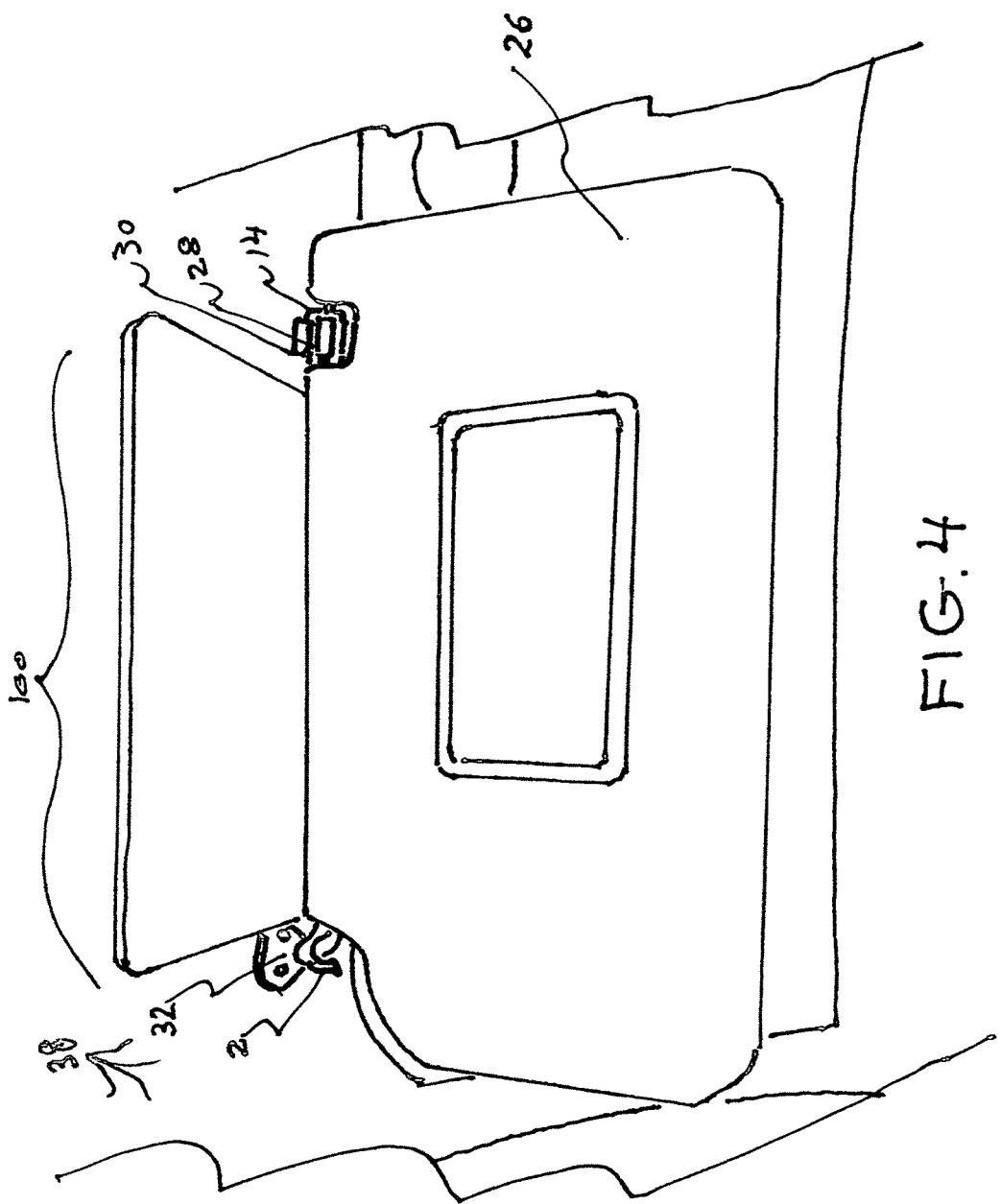
FIG. 4 is a perspective view showing the standard vehicle visor in the down position.
Figure 5:
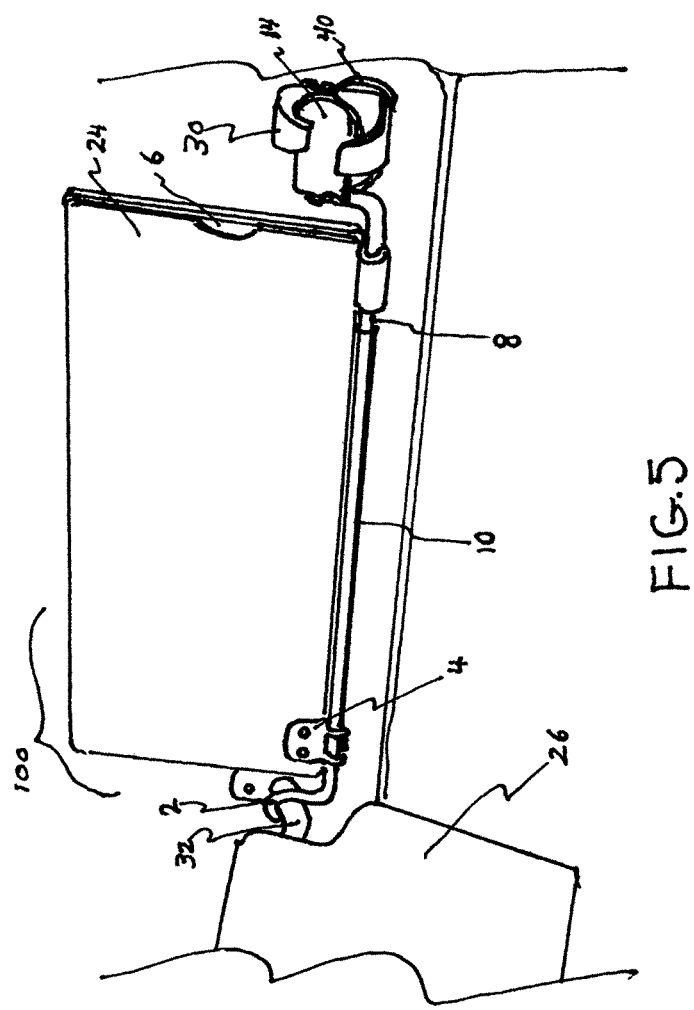
FIG. 5 is a perspective view showing the standard vehicle visor swung to the driver's side window.

FIG. 4 is a perspective view of the invention 100 while in place between folded down vehicle visor 26 and the ceiling 38 of the vehicle. Hook member 2 can be seen as it is snapped onto the hinge portion 32 of the standard vehicle visor assembly. The auxiliary visor 100 is held on the right side by the crescent shaped member 14 being trapped by the vehicle's right side C shaped 30 member, also known as a visor receiving member, which normally holds the small rod 28 portion of the standard vehicle visor 26. The crescent shaped member 14 has a thin enough cross section that it can reside along with the small rod portion 28 while both reside within the C shaped member 30. Hook member 2 is made of resilient material, such as nylon plastic so that it can snap snuggly onto the hinge post 32. The invention 100 is thin in cross section which allows it to be able to fit between the standard sun visor 26 and the ceiling of the vehicle. The offset nature of the hook member 2 and crescent shaped member 30 allow the tube 10 and thicker portion of the spring member 14 to reside beyond the leading edge of the standard visor 26, so that only the sandwich panel members 22, 6, 24 are trapped between the standard visor 26 and the ceiling of the vehicle. The overall thickness of the three panels is only approximately one eighth of an inch thick.

FIG. 5 is a perspective view of the invention 100 after the standard vehicle visor 26 has been swung towards the driver's side window. Rod 8 can slide within tube 10 to let the invention 100 fit vehicles with varying sized sun visors. Crescent member 14 includes right and left tabs that allow a rubber band to wrap around the tabs to further retain the crescent shape 14 within the standard C shaped visor post holder 30.

Figure 6:
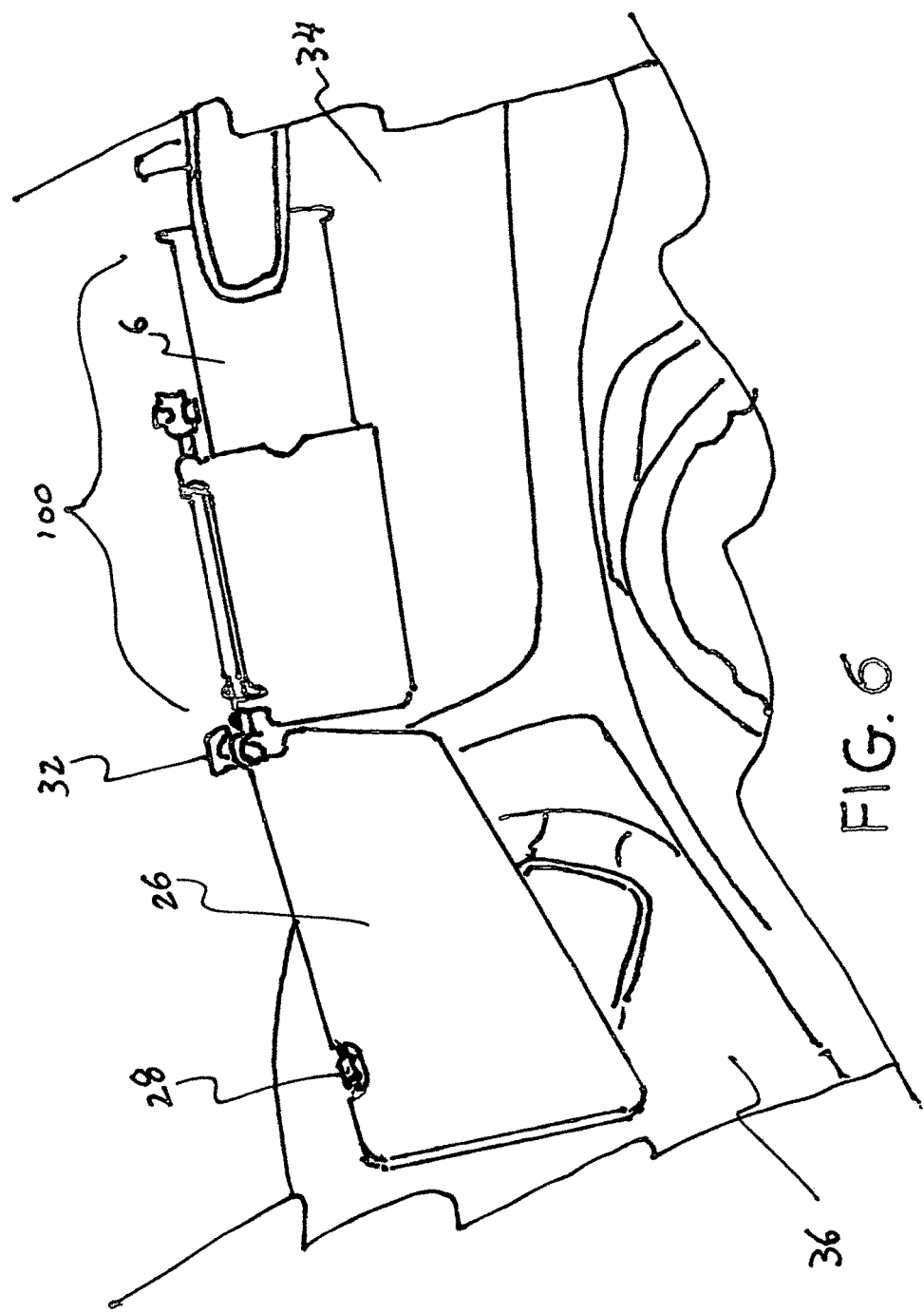
FIG. 6 is a perspective view showing the invention in use along with the standard sun visor to block on-coming sun as well as sun entering from the side window.

FIG. 6 is a perspective view showing the invention 100 in use. The auxiliary visor 100 has been swung down to block sun from entering the front windshield 34. The standard vehicle visor 26 has been swung to the left to block sun from entering the driver's side window 36. The design of the auxiliary visor 100 is such that it can be used on the driver's side visor or passenger side visor. To do this, a second crescent shaped member is included with the invention 100 where the second crescent shape is reversed to accommodate the C shaped post receiving member allocated for the passenger side visor. Middle panel 6 is shown in its extended position which provides additional sun blocking benefit for the driver.

Figure 7:
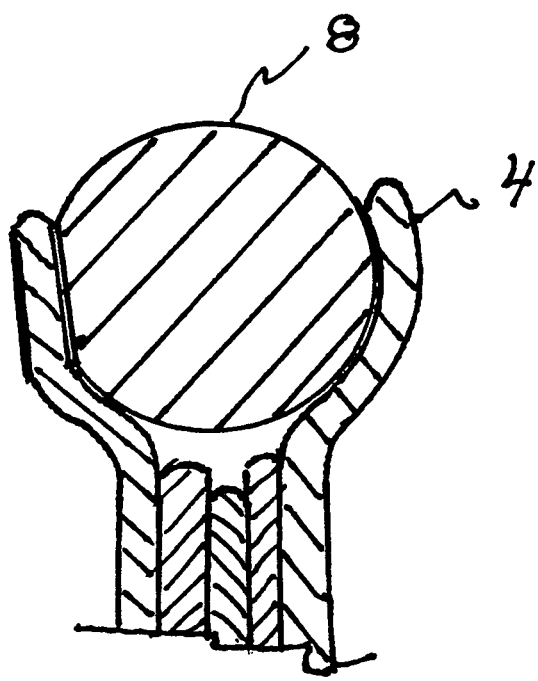
FIG. 7 is an enlarged section view as shown in FIG. 2 showing a flattened portion of rod 8.

FIG. 7 is an enlarged section view of the view shown in FIG. 2. This view shows a flattened portion on rod 8 that allows spring member 4 to more securely grip the rod 8 thereby allowing the visor to more easily remain in a relatively horizontal position when the visor is not in use. However, it should be noted that the visor will remain in place wherever it is set because of the frictional forces of spring member 4

The invention 100 is light weight, thin, and economical to manufacture making it an ideal addition to any vehicle whose driver or passengers desire safe sun blocking options while driving, or as a sun shade option while parked in a hot, sunny location.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An auxiliary sun visor assembly for use with a vehicle having a windshield, a side window adjacent to the windshield and a standard vehicle visor assembly mounted near the windshield, comprising:
   a hook assembly;
   a crescent shaped visor receiving member;
   an elongate tube;
   a sandwich of three panels, two said panels being exterior and one said panel being interior;
   a spring member;
   a tube retaining member;
   said hook assembly including a resilient U shaped member attached to a rigid metal rod member;
   said rigid rod member including a flattened portion;
   said spring member made of tempered steel and frictionally engaging said flattened portion of said rod member;
   said spring member capable of rotatably engaging said rigid metal rod member;
   said exterior panels fixedly attached on three sides and open on one side;
   said interior panel slidably engaged within said exterior panels and capable of sliding out of said open side of said exterior panels to create additional sun blocking ability;
   said U shaped member capable of snapping onto a main hinge post of a standard vehicle visor assembly;
   said crescent shaped visor receiving member fixedly attached to one end of said elongate tube;
   said metal rod member of said hook assembly slidably engaged within said elongate tube;
   said sandwich of three panels capable of remaining in a horizontally disposed position when the flat portion of said rigid rod engages the flat portion of said spring member;
   said crescent shaped visor receiving member capable of nesting in a receiving space of a standard vehicle visor receiving member; and
   said crescent shaped visor receiving member being thin enough to fit between a tubular portion found at a distal end of a standard vehicle sun visor and the receiving space of a standard vehicle visor receiving member.

2. An auxiliary sun visor as claimed in claim 1 wherein said U shaped resilient member is molded from Nylon plastic.

3. An auxiliary sun visor as claimed in claim 1 wherein said three panel sandwich is thin enough to fit between the top surface of a standard vehicle sun visor and the ceiling of the vehicle.

4. An auxiliary sun visor as claimed in claim 1 wherein, during use, the vehicle operator can swing the vehicle's standard sun visor away from its normal position so that it can block sun from the side window, and then rotate the said auxiliary sun visor down to block head on sun thereby blocking both, sun from the side and sun from head on.

5. An auxiliary sun visor as claimed in claim 1 wherein said visor can be attached to either the driver's side visor or the passenger side visor.

\* \* \* \* \*